Dec. 15, 1964    D. D. LANZ    3,161,274
ORIENTATION APPARATUS AND METHOD
Filed Sept. 25, 1961
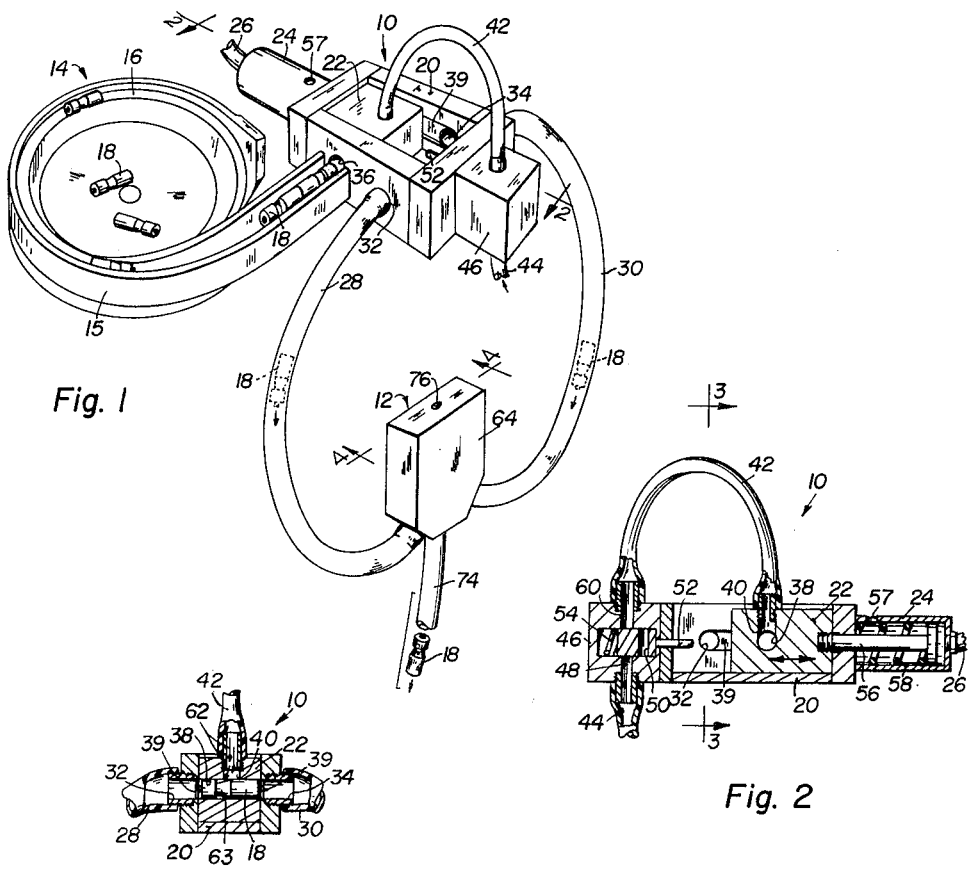
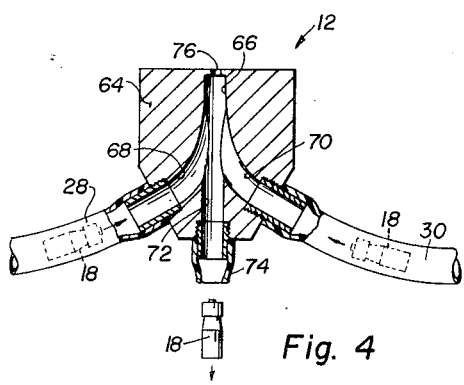
Fig. 3
Fig. 4
INVENTOR.
DONALD D. LANZ
BY
BUCKHORN, CHEATHAM & BLORE
ATTORNEYS United States Patent Office 3,161,274
Patented Dec. 15, 1964

3,161,274
ORIENTATION APPARATUS AND METHOD
Donald D. Lanz, Oregon City, Oreg., assignor to Omark Industries, Inc., Portland, Oreg., a corporation of Oregon
Filed Sept. 25, 1961, Ser. No. 140,459
8 Claims. (Cl. 193—43)

The subject matter of the present invention relates generally to apparatus and method for orienting a plurality of similar shaped articles, each having portions of different configuration so that there is a discontinuity in the outer surface thereof, and specifically includes method and apparatus employing fluid pressure for orienting welding studs and the like.

The orientation apparatus and method of the present invention is particularly useful as part of an automatic loading apparatus for an electrical welding machine such as that disclosed by Peter E. Mortensen and Raymond V. Pomeroy in a co-pending U.S. patent application, Serial No. 116,357, filed on June 12, 1961. However, the present invention may be used for orienting articles other than welding studs, including rivets, screws, pins and the like which have portions of different configuration so that there is a discontinuity in the surface of each article. Therefore, while the preferred embodiment of the present invention is described in detail with reference to the orientation of welding studs, it should be understood that other articles may be oriented by the apparatus and method of the present invention.

Previous orienting devices have suffered from the disadvantage that they are slow operating and subject to frequent jamming due to their complicated structure and operation. One such orienting device is shown in U.S. Patent No. 2,662,626, issued on December 15, 1953 to Graham et al. which uses a plurality of strategically located stops and a reciprocating plunger for orienting the welding studs. This conventional orienting device is quite complicated and as a result expensive to construct and operate. The orientation apparatus and method of the present invention overcomes the above discussed disadvantages of conventional apparatus and method by employing fluid pressure to orient the welding studs rather than the conventional mechanical stops. This orienting technique enables the orientation apparatus to be simple and inexpensive in construction and in the operation thereof.

Briefly, the orientation apparatus of the present invention includes an orienting device having a hollow casing with a sliding block therein provided with a cavity having a pair of openings at the opposite ends of such block cavity which may be aligned with an entrance hole through the wall of such casing in one position of the block, and aligned with a pair of exit holes through another portion of the wall of such casing in a second position of the block. The welding studs may enter such orienting device and be received into such cavity through such entrance hole when the block is in its first position, and may be ejected from such cavity through one of the pair of exit holes when the block is in its second position by a pulse of compressed air or other fluid directed substantially perpendicular to the axis of the welding stud in such cavity through a passage in the sliding block. The pulse of air causes the stud to move out of such orienting device in a direction determined by the axial orientation thereof in such cavity. The orientation apparatus of the present invention may also employ an inverting device for reversing the axial orientation of the studs after they are ejected from the orienting device. Such inverting device includes a solid inverter block having a recess in the interior thereof with a plurality of passageways leading from the exterior of the inverter block to the interior of such recess with two of such passageways connected as entrance passageways to the exit holes of the casing of the orienting device, and with one of such passageways connected as a common exit passageway to allow removal of the studs from the inverting device by gravity after their direction of travel has been reversed.

Therefore, one object of the present invention is to provide an improved orientation apparatus and method which employs fluid pressure to orient a plurality of articles each having portions of different configurations so that there is a discontinuity in the surface thereof.

Another object of the invention is to provide an improved orienting device employing a hollow casing having an entrance hole through the wall thereof and a pair of exit holes through such wall at a position remote from such entrance hole, and a movable block having a cavity therein with openings at the opposite ends of such cavity and a passage from the exterior of such block to the interior of such cavity for directing fluid under pressure into such cavity, after such block is moved from a first position where the openings of such cavity are in alignment with the entrance hole of such housing for receiving one of the articles to be oriented into such cavity, to a second position where the openings of such cavity are in alignment with the pair of exit holes of such housing in order to expel such one article from one of such pair of exit holes in a direction determined by the position of such article in such cavity.

A further object of the present invention is to provide an improved inverting device including a solid inverter block having a recess in the interior thereof and a plurality of passageways communicating with such recess from the exterior of such inverter block, with a pair of such passageways positioned and connected as entrance passageways to the recess for the articles to be reversed in orientation, and one of such passageways positioned and connected as an exit passageway to remove such articles by gravity from such inverter block after their orientation has been reversed in such recess.

Still another object of the present invention is to provide an improved method of orienting articles each having portions of different configurations so that there is a discontinuity in the surface thereof, in which one of such articles is placed within a container having a pair of outlet openings at opposite ends thereof, and fluid pressure is applied substantially perpendicular to the axis of such one article at such discontinuity with sufficient force so that such article moves through one of such outlet openings of such container, depending upon the orientation of the article within the container.

A still further object of the present invention is to provide an improved orientation apparatus for automatically loading a plurality of welding studs of the proper orientation into a welding apparatus, in which an orienting device is employed having a hollow casing, a sliding block therein, in which an entrance hole and a pair of exit holes extend through the wall of such casing and there is a cavity in such block having a pair of openings at the opposite ends thereof and a passage leading from the exterior of such block to the interior of such cavity, so that such sliding block may be moved from a first position in alignment with such entrance hole for receiving one of such welding studs into such cavity and then moved to a second position in alignment with such pair of exit holes for removing such one welding stud from such cavity out of the casing through one of such exit holes by a pulse of compressed air directed through such passage into such block, such apparatus also including an inverting device employing an inverter block having a recess in the interior thereof and a plurality of passageways connected from the exterior of such inverter block to the interior of such recess with two of such passageways connected as entrance passageways by transfer tubes to the outlet holes in the casing of the orienting device for transmitting the welding studs into such inverting device, and one of such passageways connected as a common exit passageway for removal of such studs by gravity from the inverting device after they have been reversed in orientation in such recess.

Additional objects and advantages of the present invention will become apparent from the following detailed description of a preferred embodiment thereof and to the attached drawings, of which:

FIG. 1 shows a preferred embodiment of the orientation apparatus of the present invention;

FIG. 2 is a sectional view of the orienting device of the present invention taken along the line 2—2 of FIG. 1;

FIG. 3 is a sectional view taken along the line 3—3 of FIG. 2 with the sliding block of the orienting device in a different position from that shown in FIG. 2; and FIG. 4 is a sectional view of the inverting device of the present invention taken along the line 4—4 of FIG. 1.

An orientation apparatus made in accordance with the present invention is shown in FIG. 1 to include an orienting device 10, an inverting device 12, and an automatic feeding device 14 which may be a conventional vibrating feeder including a feeder bowl 15 having a helical ramp 16 on the interior thereof so that a plurality of randomly oriented welding studs 18 placed in the bottom of such bowl will move up such ramp in a direction axially of such studs into orienting device 10 when the bowl 15 is vibrated with a motion having a helical component. The orienting device 10 may include a hollow metal casing 20 and a metal slide block 22 mounted for movement inside such housing by the piston of pneumatic or hydraulic cylinder 24, described in more detail below, and connected to a suitable source of compressed fluid through a fluid line 26. The orienting device 10 is connected to the inverting device 12 by a pair of hollow plastic transfer tubes 28 and 30 attached to exit holes 32 and 34, respectively, extending through the wall of the casing 22 at opposite sides thereof. These transfer tubes 28 and 30 convey the welding studs 18 from orienting device 10 to inverting device 12 after they have been axially oriented in orienting device 10 so that such studs are travelling in the tip-first direction in such transfer tubes. The welding studs 18 move from feeding device 14 into orienting device 10 through an entrance hole 36 extending through the wall of the casing 20 at a position remote from exit holes 32 and 34.

A shown in FIG. 2, the slide block 22 is provided with a stud receiving cavity 38 extending through such slide block between openings at the opposite ends of such cavity. The cavity 38 has a cylindrical shape substantially conforming to the configuration of welding studs 18, but of a slightly larger diameter. Also, a pair of clearance notches 39 are provided in the inner surface of one side of casing 20 between entrance hole 36 and exit hole 32 and on the opposite side thereof from exit hole 34 to a point opposite entrance hole 36 in order to allow sufficient clearance for the studs 18 when they are moved by slide block 22. A fluid passage 40 is provided through the top of slide block 22 from the exterior of such slide block to the interior of the receiving cavity 38, substantially halfway between the ends of such cavity. The fluid passage 40 is connected to a suitable source of fluid under pressure through a hollow plastic coupling tube 42 and a fluid line 44 attached to such fluid source, through a valve 46 mounted on end of the casing 20. This valve 46 may be of a conventional type having a sliding member 48 therein with a hole 50 through one end of such member, and an actuating pin 52 attached to such member and extending in to casing 20 for moving the sliding member 48 in response to movement of the slide block 22 against the force of a valve closing, biasing spring 54.

Opening of valve 46 is automatically accomplished by movement of slide block 22 attached to the end of a piston rod 56 extending through one side of casing 20 into the cylinder 24 which has a bleed hole 57 in one end thereof. Actuation of such piston by fluid flowing through line 26 moves slide block 22 to the left from the first position shown in FIG. 2 established by a piston biasing spring 58, to a second position in which the receiving cavity 38 is in alignment with exit holes 32 and 34 in housing 20, and actuating pin 52 is also moved to the left in FIG. 2. Such movement of valve pin 52 causes sliding member 48 to be moved to the left against biasing spring 54 until the hole 50 in such member is in alignment with a valve passage 60 extending through the valve 46 thereby allowing a short pulse of compressed air or other fluid to flow from fluid line 44 through coupling tube 42 into receiving cavity 38.

When the slide block 22 is in this second position and valve 46 is open, the short pulse of air or other fluid under pressure is directed into receiving cavity 38 through the fluid passage 40 in such slide block onto the welding stud 18 in such cavity, as shown by the arrows 62 in FIG. 3. It should be noted that the welding stud 18 is automatically positioned so that a tapered annular groove 63 discontinuity in the surface thereof providing a cone portion between the head and rear portions of such stud, lies beneath the fluid passage 40 within cavity 38. The air pulse 62, travelling substantially perpendicular to the axis of the welding stud 18, strikes such discontinuity in the surface of such stud and is deflected through the opening between the stud head and the wall of the cavity 38 into tube 28. This air pulse moves the welding stud 18 by dynamic fluid pressure from the cavity 38 to the left in FIG. 3 through exit hole 32 and into transfer tube 28 out of the orienting device 10. It should also be noted that if the axial orientation of stud 18 were reversed from that shown in FIG. 3 that such stud would be moved to the right out of exit hole 34 into transfer tube 30, rather than in the direction previously described. Therefore, the welding studs 18 will be ejected from orienting device 10 through one of the pair of exit holes 32 and 34 depending upon their axial orientation in receiving cavity 38 and both groups of studs travel tip-end first down transfer tubes 28 and 30. These transfer tubes 28 and 30 may be directly connected into a common feed tube, rather than into the inverting device 12, if it is desired to feed the welding studs into the welding apparatus tip-end first.

However, if it is desired to feed the welding studs 18 into the welding aparatus base-end first, as when using the apparatus disclosed in U.S. patent application, Serial No. 116,357 referred to above, the studs must be reversed in axial orientation from their orientation in transfer tubes 28 and 30. This is the function of the inverting device 12 which may include an inverter block 64 of metal or transparent plastic having a stud receiving recess 66 formed in the interior thereof, connected by a pair of entrance passageways 68 and 70 to transfer tubes 28 and 30, respectively, and by an exit passageway 72 to a hollow plastic feed-tube 74. The entrance passageways 68 and 70 may be positioned to form an acute angle with the axis of recess 66, and exit passageway 72 may be located substantially coaxial with such recess, so that these entrance and exit passageways have a common junction with the recess. Thus, when the welding studs 18 are forced along inside transfer tubes 28 and 30 by the pulse of compressed air, such studs are carried to recess 66 where the pulse of fluid around the studs escapes through an escapement hole 76 in the top of inverter block 64. Escapement hole 76 is of smaller diameter than the studs 18 and such studs fall by gravity through exit passageway 72 into feed-tube 74. When the welding studs 18 are positioned within the recess 66 of inverter block 64, the tip-end of such studs is adjacent the hole 76 and when such studs fall out of such recess they proceed base-end first, so that their axial orientation is reversed in recess 66 from that established by orienting device 10.

The operation of the apparatus may be briefly summarized as including the movement of welding studs 18 up the helical ramp 16 of the automatic feeder 14 into the orienting device 10 through the entrance hole 36 in housing 20 when slide block 22 is in a first position with its receiving cavity 38 in alignment with such entrance hole, so that a welding stud is received inside such receiving cavity. When it is desired to feed a stud, fluid under pressure is delivered to the cylinder 24 so that piston rod 56 moves the slide block 22 into a second position where receiving cavity 38 is in alignment with exit holes 32 and 34. This movement causes actuating pin 52 to be moved to open the valve 46 and causes a pulse of compressed air or other fluid under pressure to be transmitted through coupling tube 42 and fluid passage 40 into the receiving cavity 38. The fluid pulse is directed into contact with the surface discontinuity 63 on welding stud 18 inside cavity 38 substantially perpendicular to the axis of such stud, and is of sufficient force so that such stud moves tip-end first out of such cavity through one of the pair of exit holes 32 and 34 down transfer tube 28 or 30 into inverting device 12. After entering the recess 66 in inverter block 64 through entrance passageway 68 or 70, the welding stud 18 proceeds downward by the force of gravity, base-end first out of the inverter block into feed tube 74 through exit passageway 72 when the fluid pulse escapes through the hole 76. Fluid under pressure is delivered to the cylinder 24 for a short time only and upon release of fluid pressure in such cylinder, the springs 58 and 54, respectively, move slide block 22 and valve member 48 back to their initial first positions automatically so that the orientation apparatus is ready for another cycle of operation.

It will be obvious that various changes may be made in the specific details of the preferred embodiment of the present invention described above, without departing from the spirit of the invention. Therefore, it is not intended to limit the scope of the present invention to the specific details of the preferred embodiment, but that scope should only be determined by the following claims.

I claim:

1. An orientation device for sorting a plurality of randomly oriented, similar shaped objects, each having ends of different configuration, into two groups of objects having predetermined orientation, comprising:
   a container means having a cavity therein and a pair of outlet openings at the opposite ends of said cavity for holding one of said objects in a position inside said cavity with its ends adjacent said outlet openings; and
   means to apply fluid under pressure to said one object inside said container cavity so that said object moves out of said container through one of said outlet openings in one of two directions determined by the orientation of said object in said cavity.

2. An orientation device for changing a plurality of articles, each having a front end and a back end of different configurations, from random orientation to predetermined orientation, comprising:
   a casing having an entrance hole through the wall thereof to admit said articles to be oriented into the interior of said casing, and a pair of exit holes through said wall remote from said entrance hole for discharging articles from the interior of said casing;
   a block mounted for movement inside said casing, having a cavity therein with a pair of openings at the opposite ends of said cavity which may be aligned with said entrance hole in said casing at a first position for receiving one of said articles into said cavity and then aligned with said pair of exit holes in said casing at a second position for removing said one article from said cavity through one of said pair of exit holes depending upon the orientation of said one article in said cavity, and a passageway extending from the exterior of said block to the interior of said cavity between said pair of openings;
   means for feeding said articles through said entrance hole in said casing into said cavity in said block, one at a time;
   means for moving said block within said casing between said first position and said second position; and
   means for applying fluid under pressure to said one article in said cavity while said block is in said second position, through said passageway in said block communicating with said cavity so that said one article moves out of said cavity through one of said pair of exit holes in said casing in a direction dependent upon the orientation of said front and back ends of said article in said cavity.

3. An orientation device for changing a plurality of articles, each having a front end and a back end of different configurations, from a random orientation to the same predetermined orientation, comprising:
   a casing having an entrance hole through the wall thereof to admit said articles to be oriented into the interior of said casing, and a pair of exit holes through said wall remote from said entrance hole to remove said articles from the interior of said casing;
   a block mounted for movement inside said casing, having a cavity therein with a pair of apertures at the opposite ends of said cavity which may be aligned with said entrance hole in said casing at a first position for receiving one of said articles into said cavity and then aligned with said pair of exit holes in said casing at a second position for removing said one article from said cavity through one of said pair of exit holes depending upon the orientation of said one article in said cavity, and a passageway extending from the exterior of said block to the interior of said cavity between said pair of apertures;
   means for feeding said articles through said entrance hole in said casing into said cavity in said block, one at a time;
   means for moving said block within said casing between said first position and said second position;
   means for applying fluid pressure to said one article in said cavity while said block is in said second position, through said passageway in said block communicating with said cavity so that said one article moves out of said cavity through one of said pair of apertures in said block and one of said pair of exit holes in said casing in a direction dependent upon the orientation of said front and back ends of said article in said cavity; and
   means connected to each of said pair of exit holes for combining said articles passing through each of said exit holes into a single group of said articles having the same predetermined orientation.

4. An orientation device for changing a plurality of articles, each having a front end and a back end of different configurations, from a random orientation to the same predetermined orientation, comprising:
   a casing having an entrance hole through the wall thereof to admit said articles to be oriented into the interior of said casing, and a pair of exit holes through said wall remote from said entrance hole to remove said articles from the interior of said casing;
   a block member mounted for movement inside said casing, having a cavity therein with a pair of openings at the opposite ends of said cavity which may be aligned with said entrance hole in said casing at a first position for receiving one of said articles into said cavity, and then aligned with said pair of exit holes in said casing at a second position for removing said one article from said cavity through one of said pair of exit holes depending upon the orientation of said one article in said cavity, and a passageway extending from the exterior of said block to the interior of said cavity between said pair of openings;
   means for feeding said articles through said entrance hole in said casing into said cavity in said block member, one at a time;

means for moving said block member with said casing between said first position and said second position;

an inversion block having a recess therein with a pair of entrance passageways axially displaced from said recess and an exit passageway in substantial axial alignment with said recess, said pair of entrance passageways and said exit passageway extending from the exterior of said inversion block to the interior of said recess so that said articles are reversed in orientation when they leave said inversion block through said exit passageway from their orientation as the time of entry into said inversion block through said entrance passageway; and means for applying fluid pressure to said one article in said cavity while said block member is in said second position through said passageway in said block communicating with said cavity, including a pair of transfer tubes connected between said exit holes and said entrance passageways so that said one article moves out of said cavity through one of said pair of openings in said block member and one of said exit holes in said casing in a direction dependent upon the orientation of said front and back ends of said article in said cavity, then moves along one of said transfer tubes into said recess through one of said entrance passageways in said inversion block, reverses its orientation and falls from said inversion block through said exit passageway.

5. An inversion device for reversing the orientation of a plurality of objects, each having front and back ends of different shape, comprising:

a member having a cavity therein and a plurality of unobstructed passageways extending from the exterior of said member into the interior of said cavity, with at least two of said passageways being axially displaced from said cavity and extending to a common junction with said cavity to function as entrance passageways allowing said objects to enter said cavity, and one of said passageways being in substantial axial alignment with said cavity so that it functions as an exit passageway for allowing the removal of said objects from said cavity by the force of gravity; and means for applying fluid pressure to said objects when they are in said entrance passageways to move said objects into said cavity through said entrance passageways and for reducing said fluid pressure in said cavity to allow said objects to fall by gravity from said cavity through said exit passageway out of said inversion device.

6. An inversion device for reversing the orientation of a plurality of objects, each having front and back ends of different shape, comprising:

a block member having a cavity therein and a plurality of unobstructed passageways extending from the exterior of said block member to a common junction with the interior of said cavity, said passageways having substantially the same cross section as said cavity, with at least two of said passageways forming an acute angle with the axis of said cavity and serving as entrance passageways allowing said objects to enter said cavity, and one of said passageways being in substantial axial alignment with said cavity so that it functions as an exit passageway for allowing the removal of said objects from said cavity by the force of gravity; and means for applying fluid pressure to said objects when they are in said entrance passageways to move said objects into said cavity through said entrance passageways and for reducing said fluid pressure in said cavity to allow said objects to reverse their direction of travel and to fall by gravity from said cavity through said exit passageway out of said inversion device.

7. An orientation device for sorting a plurality of randomly oriented objects, each having opposite ends of different configuration, into two groups of objects having predetermined orientation, comprising:

container means having a cavity therein and a pair of outlet openings at the opposite ends of said cavity, for holding one of said objects in a position inside said cavity with its ends in alignment with said outlet openings;

feeder means for feeding said objects into said container means, one at a time; and means to apply fluid under pressure to the one object inside said cavity so that said one object moves out of said container means through one of said outlet openings in one of two different directions determined by the orientation of said one object in said cavity.

8. An orientation device for sorting a plurality of randomly oriented objects, each having opposite ends of different configuration, into a group of objects having predetermined orientation, comprising;

container means having a cavity therein and a pair of outlet openings at the opposite ends of said cavity, for holding one of said objects in a position inside said cavity with its ends in alignment with said outlet openings;

feeder means for feeding said objects into said container means, one at a time;

means to apply fluid under pressure to the one object inside said cavity so that said one object moves out of said container means through one of said outlet openings in one of two different directions determined by the orientation of said one object in said cavity; and inverter means connected to each of said outlet openings for reversing the orientation of the objects passing through said outlet openings and for combining the objects into a single group of objects having the same predetermined orientation.

References Cited in the file of this patent
UNITED STATES PATENTS

| | | |
|---|---|---|
| 2,889,023 | Moncrieff | June 2, 1959 |
| 2,890,913 | Miskel | June 16, 1959 |
| 2,976,978 | Huller | Mar. 28, 1961 |
| 3,015,413 | Hengel | Jan. 2, 1962 |